(12) United States Patent
Spahl et al.

(10) Patent No.: US 9,248,857 B2
(45) Date of Patent: Feb. 2, 2016

(54) LATERALLY TILTABLE, MULTITRACK VEHICLE

(71) Applicant: FORD GLOBAL TECHNOLOGIES, LLC, Dearborn, MI (US)

(72) Inventors: Robert Spahl, Cologne (DE); Edmund Halfmann, Neuss (DE); Torsten Gerhardt, London (GB); Marc Simon, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/201,586

(22) Filed: Mar. 7, 2014

(65) Prior Publication Data

US 2014/0252731 A1    Sep. 11, 2014

(30) Foreign Application Priority Data

Mar. 7, 2013 (DE) .......................... 10 2013 203 922

(51) Int. Cl.
| | |
|---|---|
| *B62D 9/02* | (2006.01) |
| *B60G 21/073* | (2006.01) |
| *B60G 17/00* | (2006.01) |
| *B62D 61/06* | (2006.01) |

(Continued)

(52) U.S. Cl.
CPC  *B62D 9/02* (2013.01); *B60G 17/00* (2013.01); *B60G 21/05* (2013.01); *B60G 21/073* (2013.01); *B62D 9/04* (2013.01); *B62D 61/06* (2013.01); *B62K 5/10* (2013.01); *B60G 2204/8304* (2013.01); *B60G 2300/45* (2013.01); *B62D 31/003* (2013.01)

(58) Field of Classification Search
CPC ............. B60G 21/05; B62D 9/02; B62K 5/10
USPC ...................... 280/5.5, 5.508, 5.509, 124.128, 280/124.129
See application file for complete search history.

(56) References Cited

U.S. PATENT DOCUMENTS

| | | | |
|---|---|---|---|
| 2,353,503 | A | 7/1944 | Rost et al. |
| 2,474,471 | A | 6/1949 | Dolan |

(Continued)

FOREIGN PATENT DOCUMENTS

| | | |
|---|---|---|
| DE | 679 966 C | 8/1939 |
| DE | 1 937 578 U | 1/1963 |

(Continued)

OTHER PUBLICATIONS

German Search Report for Application No. 10 2013 203 923.9 dated Oct. 8, 2013.

(Continued)

*Primary Examiner* — Drew Brown
(74) *Attorney, Agent, or Firm* — Jones Robb, PLLC; Raymond L. Coppiellie (57) ABSTRACT

A laterally tiltable, multitrack vehicle is disclosed. The vehicle includes a vehicle body and at least three wheels, first and second wheels of the three wheels being assigned to a common axle to form a first wheel pair. The vehicle includes at least one wheel control part suspending each of the first and second wheels of the wheel pair from the vehicle body. At least one resilient element supports each wheel control part on the vehicle body. The resilient element has a non-linear spring characteristic with a spring rate which increases in a compression direction and decreases in a rebound direction. The vehicle may be a motor vehicle.

19 Claims, 5 Drawing Sheets

(51) Int. Cl.
  *B62D 9/04* (2006.01)
  *B62K 5/10* (2013.01)
  *B60G 21/05* (2006.01)
  *B62D 31/00* (2006.01)

(56) References Cited

U.S. PATENT DOCUMENTS

| | | | |
|---|---|---|---|
| 3,417,985 A | 12/1968 | Hannan | |
| 3,558,123 A * | 1/1971 | Yew | 267/34 |
| 3,572,456 A | 3/1971 | Healy | |
| 4,375,293 A * | 3/1983 | Solbes | 280/22.1 |
| 5,040,812 A | 8/1991 | Patin | |
| 5,040,823 A | 8/1991 | Lund | |
| 5,069,476 A | 12/1991 | Tsutsumi et al. | |
| 5,116,069 A | 5/1992 | Miller | |
| 5,161,425 A | 11/1992 | Baskett et al. | |
| 5,161,822 A | 11/1992 | Lund | |
| 5,207,451 A | 5/1993 | Furuse et al. | |
| 5,324,056 A * | 6/1994 | Orton | 280/124.106 |
| 5,337,847 A | 8/1994 | Woods et al. | |
| 5,347,457 A | 9/1994 | Tanaka et al. | |
| 5,580,089 A | 12/1996 | Kolka | |
| 5,611,555 A | 3/1997 | Vidal | |
| 5,762,351 A | 6/1998 | SooHoo | |
| 5,765,115 A | 6/1998 | Ivan | |
| 5,765,846 A | 6/1998 | Braun | |
| 5,772,224 A | 6/1998 | Tong | |
| 5,791,425 A | 8/1998 | Kamen et al. | |
| 5,825,284 A | 10/1998 | Dunwoody et al. | |
| 5,839,082 A | 11/1998 | Iwasaki | |
| 5,927,424 A | 7/1999 | Van Den Brink et al. | |
| 6,026,920 A | 2/2000 | Obeda et al. | |
| 6,116,618 A | 9/2000 | Shono et al. | |
| 6,142,494 A | 11/2000 | Higuchi | |
| 6,149,226 A | 11/2000 | Hoelzel | |
| 6,213,561 B1 | 4/2001 | Witthaus | |
| 6,250,649 B1 | 6/2001 | Braun | |
| 6,311,795 B1 | 11/2001 | Skotnikov | |
| 6,328,125 B1 | 12/2001 | Van Den Brink et al. | |
| 6,367,824 B1 * | 4/2002 | Hayashi | 280/62 |
| 6,390,505 B1 | 5/2002 | Wilson | |
| 6,425,585 B1 | 7/2002 | Schuelke et al. | |
| 6,435,522 B1 | 8/2002 | Van Den Brink et al. | |
| 6,446,980 B1 | 9/2002 | Kutscher et al. | |
| 6,454,035 B1 | 9/2002 | Waskow et al. | |
| 6,460,835 B1 * | 10/2002 | Hamano et al. | 267/34 |
| 6,467,783 B1 | 10/2002 | Blondelet et al. | |
| 6,722,676 B2 * | 4/2004 | Zadok | 280/124.106 |
| 6,805,362 B1 | 10/2004 | Melcher | |
| 6,817,617 B2 * | 11/2004 | Hayashi | 280/5.509 |
| 7,066,474 B2 | 6/2006 | Hiebert et al. | |
| 7,073,806 B2 | 7/2006 | Bagnoli | |
| 7,097,187 B2 | 8/2006 | Walters et al. | |
| 7,131,650 B2 * | 11/2006 | Melcher | 280/5.52 |
| 7,229,086 B1 | 6/2007 | Rogers | |
| 7,389,592 B2 | 6/2008 | Tsuruta et al. | |
| 7,487,985 B1 | 2/2009 | Mighell | |
| 7,568,541 B2 * | 8/2009 | Pfeil et al. | 180/210 |
| 7,591,337 B2 | 9/2009 | Suhre et al. | |
| 7,607,695 B2 * | 10/2009 | Moulene et al. | 280/775 |
| 7,640,086 B2 | 12/2009 | Nakashima et al. | |
| 7,641,207 B2 | 1/2010 | Yang | |
| 7,648,148 B1 | 1/2010 | Mercier | |
| 7,665,742 B2 | 2/2010 | Haerr et al. | |
| 7,673,883 B2 | 3/2010 | Damm | |
| 7,887,070 B2 | 2/2011 | Kirchner | |
| 7,896,360 B2 | 3/2011 | Buma | |
| 7,946,596 B2 | 5/2011 | Hsu et al. | |
| 8,050,820 B2 | 11/2011 | Yanaka et al. | |
| 8,104,781 B2 * | 1/2012 | Gazarek | 280/124.141 |
| 8,260,504 B2 | 9/2012 | Tsujii et al. | |
| 8,262,111 B2 * | 9/2012 | Lucas | 280/124.103 |
| 8,345,096 B2 | 1/2013 | Ishiyama et al. | |
| 8,641,064 B2 * | 2/2014 | Krajekian | 280/124.103 |
| 8,818,700 B2 * | 8/2014 | Moulene et al. | 701/124 |

| | | | |
|---|---|---|---|
| 2001/0028154 A1 | 10/2001 | Sebe | |
| 2002/0109310 A1 | 8/2002 | Lim et al. | |
| 2002/0171216 A1 | 11/2002 | Deal | |
| 2003/0071430 A1 | 4/2003 | Serra et al. | |
| 2003/0102176 A1 | 6/2003 | Bautista | |
| 2003/0141689 A1 | 7/2003 | Hamy | |
| 2003/0197337 A1 | 10/2003 | Dodd et al. | |
| 2004/0051262 A1 | 3/2004 | Young | |
| 2004/0100059 A1 | 5/2004 | Van Den Brink | |
| 2004/0134302 A1 | 7/2004 | Ko et al. | |
| 2004/0236486 A1 | 11/2004 | Krause et al. | |
| 2005/0051976 A1 | 3/2005 | Blondelet et al. | |
| 2005/0082771 A1 | 4/2005 | Oh | |
| 2005/0127656 A1 | 6/2005 | Sato et al. | |
| 2005/0184476 A1 | 8/2005 | Hamm | |
| 2005/0199087 A1 | 9/2005 | Li et al. | |
| 2005/0206101 A1 | 9/2005 | Bouton | |
| 2005/0275181 A1 | 12/2005 | MacIsaac | |
| 2006/0049599 A1 | 3/2006 | Lehane | |
| 2006/0091636 A1 | 5/2006 | Shelton | |
| 2006/0151982 A1 | 7/2006 | Mills | |
| 2006/0170171 A1 | 8/2006 | Pedersen | |
| 2006/0220331 A1 | 10/2006 | Schafer et al. | |
| 2006/0226611 A1 | 10/2006 | Xiao et al. | |
| 2006/0249919 A1 | 11/2006 | Suzuki et al. | |
| 2006/0276944 A1 | 12/2006 | Yasui et al. | |
| 2007/0075517 A1 | 4/2007 | Suhre et al. | |
| 2007/0078581 A1 | 4/2007 | Nenninger et al. | |
| 2007/0126199 A1 | 6/2007 | Peng et al. | |
| 2007/0151780 A1 | 7/2007 | Tonoli et al. | |
| 2007/0182120 A1 | 8/2007 | Tonoli et al. | |
| 2007/0193803 A1 | 8/2007 | Geiser | |
| 2007/0193815 A1 | 8/2007 | Hobbs | |
| 2007/0228675 A1 | 10/2007 | Tonoli et al. | |
| 2008/0012262 A1 | 1/2008 | Carabelli et al. | |
| 2008/0033612 A1 | 2/2008 | Raab | |
| 2008/0100018 A1 | 5/2008 | Dieziger | |
| 2008/0114509 A1 | 5/2008 | Inoue et al. | |
| 2008/0135320 A1 | 6/2008 | Matthies | |
| 2008/0164085 A1 | 7/2008 | Cecinini | |
| 2008/0197597 A1 | 8/2008 | Moulene et al. | |
| 2008/0197599 A1 | 8/2008 | Comstock et al. | |
| 2008/0238005 A1 | 10/2008 | James | |
| 2008/0255726 A1 | 10/2008 | Fischlein et al. | |
| 2008/0258416 A1 | 10/2008 | Wilcox | |
| 2008/0272562 A1 | 11/2008 | Sabelstrom et al. | |
| 2009/0085311 A1 | 4/2009 | Kim et al. | |
| 2009/0105906 A1 | 4/2009 | Hackney et al. | |
| 2009/0108555 A1 | 4/2009 | Wilcox | |
| 2009/0171530 A1 | 7/2009 | Bousfield | |
| 2009/0289437 A1 | 11/2009 | Steinhilber | |
| 2009/0299565 A1 | 12/2009 | Hara et al. | |
| 2009/0312908 A1 | 12/2009 | Van Den Brink | |
| 2009/0314566 A1 | 12/2009 | Rust | |
| 2010/0025944 A1 | 2/2010 | Hara et al. | |
| 2010/0032914 A1 | 2/2010 | Hara et al. | |
| 2010/0032915 A1 | 2/2010 | Hsu et al. | |
| 2010/0044977 A1 | 2/2010 | Hughes et al. | |
| 2010/0044979 A1 | 2/2010 | Haeusler et al. | |
| 2010/0152987 A1 | 6/2010 | Gorai | |
| 2011/0006498 A1 | 1/2011 | Mercier | |
| 2011/0095494 A1 | 4/2011 | White | |
| 2011/0148052 A1 | 6/2011 | Quemere | |
| 2011/0215544 A1 | 9/2011 | Rhodig | |
| 2011/0254238 A1 | 10/2011 | Kanou | |
| 2012/0098225 A1 * | 4/2012 | Lucas | 280/124.103 |
| 2012/0248722 A1 | 10/2012 | Tsujii et al. | |
| 2013/0068550 A1 | 3/2013 | Gale | |
| 2013/0153311 A1 | 6/2013 | Huntzinger | |
| 2013/0168934 A1 * | 7/2013 | Krajekian | 280/62 |
| 2014/0252730 A1 | 9/2014 | Spahl et al. | |
| 2014/0252732 A1 | 9/2014 | Spahl et al. | |
| 2014/0252733 A1 | 9/2014 | Spahl et al. | |
| 2014/0252734 A1 | 9/2014 | Spahl et al. | |

FOREIGN PATENT DOCUMENTS

| | | |
|---|---|---|
| DE | 6801096 U | 11/1967 |
| DE | 40 35 128 A1 | 6/1992 |

(56) References Cited

FOREIGN PATENT DOCUMENTS

| | | |
|---|---|---|
| DE | 41 35 585 A1 | 5/1993 |
| DE | 42 36 328 C1 | 9/1993 |
| DE | 43 15 017 C1 | 9/1994 |
| DE | 196 21 947 C1 | 10/1997 |
| DE | 197 35 912 A1 | 3/1998 |
| DE | 198 48 294 A1 | 10/1999 |
| DE | 198 38 328 C1 | 12/1999 |
| DE | 198 31 162 A1 | 7/2000 |
| DE | 102 51 946 B3 | 3/2004 |
| DE | 103 49 655 A1 | 6/2005 |
| DE | 10 2004 027 202 A1 | 10/2005 |
| DE | 10 2004 058 523 A1 | 6/2006 |
| DE | 11 2006 002 581 T5 | 9/2008 |
| DE | 102007024769 A1 | 11/2008 |
| DE | 10 2008 046 588 A1 | 3/2010 |
| DE | 10 2009 042 662 A1 | 3/2011 |
| DE | 10 2010 000 884 A1 | 7/2011 |
| DE | 10 2010 000 886 A1 | 7/2011 |
| DE | 10 2010 055 947 A1 | 8/2011 |
| DE | 102010041404 A1 | 3/2012 |
| EP | 0 592 377 A1 | 4/1994 |
| EP | 0 626 307 A1 | 11/1994 |
| EP | 0 658 453 B1 | 6/1995 |
| EP | 1 030 790 B1 | 8/2000 |
| EP | 1 142 779 A2 | 10/2001 |
| EP | 1 153 773 A2 | 11/2001 |
| EP | 1 155 950 A2 | 11/2001 |
| EP | 1 180 476 B1 | 2/2002 |
| EP | 1 228 905 A2 | 8/2002 |
| EP | 1 346 907 A2 | 9/2003 |
| EP | 1 348 617 B1 | 10/2003 |
| EP | 1 419 909 B1 | 5/2004 |
| EP | 1 539 563 B1 | 6/2005 |
| EP | 1 630 081 A1 | 3/2006 |
| EP | 1 702 773 A2 | 9/2006 |
| EP | 1 872 981 A1 | 1/2008 |
| EP | 1 944 228 A1 | 7/2008 |
| EP | 2 030 814 A2 | 3/2009 |
| EP | 2077223 A1 | 7/2009 |
| EP | 2 199 122 A1 | 6/2010 |
| EP | 2 213 561 A1 | 8/2010 |
| FR | 2 663 283 A1 | 12/1991 |
| FR | 2 768 203 A1 | 3/1999 |
| FR | 2 872 699 A1 | 1/2006 |
| FR | 2 927 026 A1 | 8/2009 |
| FR | 2 937 000 A1 | 4/2010 |
| FR | 2 946 944 A1 | 12/2010 |
| GB | 2 322 837 A | 9/1998 |
| GB | 2 382 334 A | 11/2001 |
| GB | 2 374 327 A | 10/2002 |
| GB | 2 390 065 A | 12/2003 |
| GB | 2 394 701 A | 5/2004 |
| GB | 2 444 250 A | 6/2008 |
| GB | 2 450 740 A | 1/2009 |
| GB | 2 472 180 A | 2/2011 |
| GB | 2 492 757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | WO-2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011/023862 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011/107674 A1 | 9/2011 |

OTHER PUBLICATIONS

German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Office Action dated Nov. 28, 2014 for U.S. Appl. No. 14/201,550.
Office Action dated Oct. 10, 2014 for U.S. Appl. No. 14/201,602.
Office Action dated Sep. 4, 2014 for U.S. Appl. No. 14/201,628.
Office Action dated Dec. 26, 2014 of U.S. Appl. No. 14/201,628.
Office Action dated Mar. 11, 2015 for U.S. Appl. No. 14/201,628.
Office Action dated Jan. 29, 2015 for U.S. Appl. No. 14/201,616.

* cited by examiner

LATERALLY TILTABLE, MULTITRACK VEHICLE

CROSS REFERENCE TO RELATED APPLICATIONS

This application claims priority to German Application No. 102013203922.0, filed on Mar. 7, 2013, the entire content of which is incorporated by reference herein. This application also is related to German Application No. 102013203923.9, filed Mar. 7, 2013; German Application No. 102013203927.1, filed Mar. 7, 2013; German Application No. 102013203926.3, filed Mar. 7, 2013; and German Application No. 102013203924.7, filed Mar. 7, 2013, the entire content of each of which is incorporated by reference herein.

TECHNICAL FIELD

The present disclosure relates generally to a laterally tillable multitrack vehicle, such as a motor vehicle, and more particularly to a laterally tiltable multitrack vehicle having the ability to self-upright after tilting.

BACKGROUND

In recent years, interest in vehicles with innovative designs has grown in view of continued expansion of urban areas, the large number of vehicles operating in these areas, and the associated problems, such as traffic jams or environmental pollution. One way to solve parking problems and/or to improve the traffic flow is to design vehicles in a manner that permits a plurality of vehicles to share a parking space or a driving lane. In order for such a solution to be feasible, vehicles must be small and, in particular, narrow. A vehicle of this type is usually sized to convey no more than one to two persons. The small size and the low weight of such vehicles make it possible to reduce the engine power output and also the emissions caused by the vehicle without any loss of driving performance.

Many attempts have been made in recent years to develop multitrack, laterally tiltable vehicles, in which the entire vehicle or a part thereof tilts in toward a rotation center (e.g., the curve bend inner side) in a similar manner to a bicycle when driving around curves. With such tilting, the resultant of the weight force and the centrifugal force runs substantially along the vertical axis of the vehicle body, preventing the vehicle from turning over. Accordingly, lateral tipping of the vehicle toward the bend outer side can be prevented, even in the case of a relatively narrow track width of the laterally tiltable vehicle (as compared with conventional, multitrack vehicles).

Different types of laterally tiltable vehicles having three or four wheels have been disclosed in practice. For example, in some three-wheeled vehicles, merely the vehicle body and the central wheel can be tilted, whereas the wheel pair has two eccentric wheels which are arranged on a common axle and cannot be tilted. In general, however, a solution is preferred, in which all the wheels can tilt together with the vehicle body, since this solution requires less installation space in relation to the width of the vehicle and the vehicle is therefore of narrower overall design.

One important aspect in laterally tiltable vehicles is ability to right itself (self-uprighting) after tilting. Normally, the centroid of the vehicle drops during lateral tilting of the vehicle body. This means, however, that the vehicle body of the laterally tilted, multitrack vehicle will not upright itself again automatically. An elegant possibility for achieving automatic uprighting of the laterally tilted vehicle body is to raise the centroid of the vehicle during lateral tilting as the tilting angle increases. In addition, this solution affords the essential advantage that the vehicle automatically assumes a stable, upright position even at a standstill, since the centroid of the vehicle is at the lowest in this position. Accordingly, the present disclosure is directed to providing an automatic self-uprighting multitrack, laterally bitable vehicle. The present disclosure is further directed to providing such a vehicle having a compact overall design, in order to keep the required installation space as small as possible in order to realize a narrow vehicle.

SUMMARY

In accordance with various exemplary embodiments, the present disclosure provides a laterally tiltable, multitrack vehicle. The vehicle comprises a vehicle body and at least three wheels. First and second wheels of the three wheels are assigned to a common axle to form a first wheel pair. At least one wheel control part suspends each of the first and second wheels of the wheel pair from the vehicle body. At least one resilient element supports each wheel control part on the vehicle body. The resilient element has a non-linear spring characteristic with a spring rate which increases in a compression direction and decreases in a rebound direction.

In accordance with one aspect of the present disclosure, the vehicle is a motor vehicle.

In accordance with another aspect of the present disclosure, the resilient elements are helical springs with a progressive spring rate.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a laterally tiltable, multitrack motor vehicle is provided. The vehicle has at least three wheels, a vehicle body, for example a vehicle frame, and at least one wheel pair. The wheel pair includes two wheels which are assigned to a common axle. Each of the wheels of the wheel pair is suspended on the vehicle body via at least one wheel control part. The wheel control part may include, for example, a wheel control link such as a longitudinal link or a wishbone. Furthermore, the wheel control parts of the wheel pair are supported on the vehicle body via at least one resilient element. As disclosed herein, the resilient element has a non-linear spring characteristic. That is to say, the spring rate of the resilient element changes with the spring travel in such a way that it increases in a compression direction of the resilient element and decreases in a rebound direction of the resilient element. As used in this application, the compression direction is a direction in which the wheel of the wheel pair, which is suspended on the vehicle body via the associated wheel control part, moves in the direction of the vehicle body and, as a result, the length of the resilient element is shortened. As used herein, the rebound direction is the opposite direction to the compression direction. In the rebound direction, the length of the resilient element increases. That is, the upward suspension travel that compresses the resilient element is called compression and the downward travel of the wheel that extends the resilient element is called the rebound.

The wheel control part, in combination with the resilient element, achieves a situation where, during lateral tilting of the vehicle body and of the wheels of the wheel pair toward the inner side of the bend, for example when driving around a bend, the outer wheel in the bend (also referred to herein as the tilting outer wheel) and its respective resilient element rebound, while the inner wheel in the bend (also referred to herein as the tilting inner wheel) and its respective resilient element compress. As a result of the non-linear spring characteristic of the resilient element, in which the spring rate increases in the compression direction and the spring rate decreases in the rebound direction, the tilting inner wheel compresses by a smaller spring travel than the tilting outer wheel rebounds. This compressing and rebounding leads overall to a vehicle body which is inclined laterally toward the inner side of the bend. As the vehicle body inclines laterally toward the inner side of the bend, the centroid of the vehicle is raised. Because the centroid of the vehicle is raised during tilting, it is possible for the vehicle body to automatically self-upright into the upright, neutral position of the vehicle body. In particular, since the centroid of the vehicle has its lowest location when the vehicle body is in the upright, neutral position, the vehicle can automatically return to this position from a tilted position, in which the centroid of the vehicle is raised.

The provision of the resilient elements with a non-linear spring characteristic realizes the automatic self-uprighting in a multitrack, laterally tiltable vehicle without requiring any additional installation space, since the vehicle, in so far as it is to afford a certain minimum driving comfort, in every case has resilient elements for supporting the vehicle body elastically with respect to the wheels. Therefore, ideally, no additional installation space is required to provide a laterally tiltable, multitrack vehicle in which an automatic self-uprighting capability is realized.

According to one aspect of the disclosure, the wheel control part comprises at least one longitudinal link. One end of the link is mounted pivotably on the vehicle body and the other end is mounted rotatably to the wheel. Accordingly, each wheel of the wheel pair is suspended independently on the vehicle body via one longitudinal link. In the case of driven rear wheels on the multitrack, laterally tiltable motor vehicle, a longitudinal link suspension system affords the advantage that the rear wheels can be driven via a chain or belt drive.

Additionally or alternatively, the present disclosure contemplates that the wheel control part may comprise at least one spring strut. One end of the spring strut is mounted at one end on the vehicle body and the other end is rotatably mounted to the wheel. Accordingly, each wheel of the wheel pair is suspended independently on the vehicle body via one spring strut. In contrast to the longitudinal link suspension system which is mounted pivotably on the vehicle body and guides the wheels, mounted rotatably on the longitudinal links, of a wheel pair on a circular path, the spring strut guides the wheel, mounted rotatably at one end, of a wheel pair along a linear track. The spring strut advantageously forms one structural unit with the resilient element and can additionally also form one structural unit with a vibration damper.

In accordance with another aspect of the present disclosure, the resilient elements, on which the wheel control parts of the wheel pair are supported, may each be connected in an articulated manner to a respective limb of a double lever which is mounted in its center, with regard to its longitudinal extent, rotatably on the vehicle body. The longitudinal extent of the double lever is understood to be a direction which is transverse with respect to a longitudinal center plane of the vehicle. The wheel control parts of the wheel pair are therefore supported on the vehicle body via the resilient elements and the rotatable double lever. The double lever, also called balancing lever herein, serves to distribute the wheel contact forces as uniformly as possible across the tilting inner wheel and the tilting outer wheel of a wheel pair during lateral tilting.

According to an alternative exemplary embodiment of the present disclosure, the wheel control parts of the wheel pair are connected in an articulated manner to a respective limb of a double lever. The limb in turn is rotatably mounted on the vehicle body via the resilient elements, which are arranged eccentrically with regard to the longitudinal extent of the limb. The longitudinal extent of the double lever as used herein is understood to be a direction which is transverse with respect to a longitudinal center plane of the vehicle. Accordingly, the wheel control parts are connected via the double or balancing lever to the resilient elements, which for their part are supported on the vehicle body. The double lever has the same function as that in the above-described embodiment.

According to a further aspect of the present teachings, the multitrack, laterally tiltable vehicle includes two wheel pairs, each wheel pair having two wheels assigned to a common axle and supported on the vehicle in the above-described manner. The first wheel pair of the vehicle forms steerable front wheels and the second wheel pair forms the rear wheels of the vehicle.

In accordance with another aspect of the disclosure, the resilient element is a helical spring with a progressive spring rate. Helical springs of this type can advantageously be used to realize automatic self-uprighting of the multitrack, laterally tiltable vehicle, as has already been described. Instead of helical springs, it should be understood that other known, resilient elements can also be used for the same purpose, in so far as they are resilient and have a progressive spring rate.

Figure 1A:
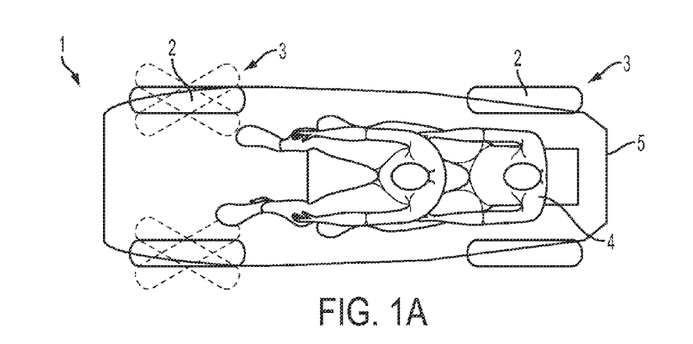
FIG. 1A shows a plan view of a first exemplary embodiment of a multitrack, laterally tiltable vehicle in accordance with the present disclosure.
Figure 1B:
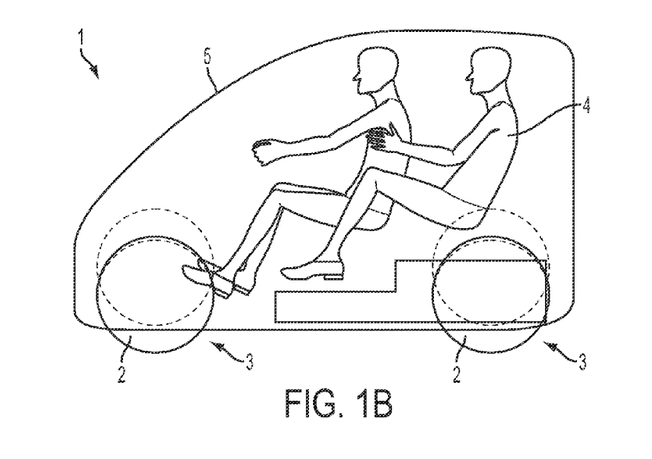
FIG. 1B shows a side view of the first exemplary embodiment of a multitrack, laterally tiltable vehicle of FIG. 1A in accordance with the present disclosure.
Figure 1C:
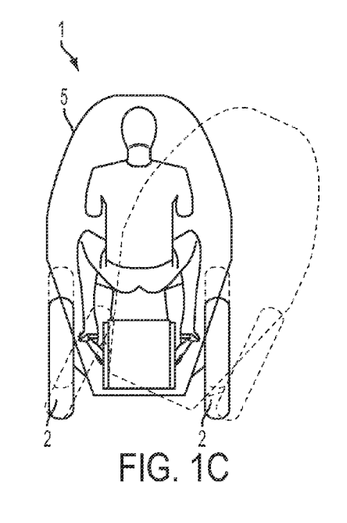
FIG. 1C shows a rear view of the first exemplary embodiment of a multitrack, laterally tiltable vehicle of FIG. 1A in accordance with the present disclosure.

FIGS. 1A-1C show a plan view, a side view, and a rear view of a first exemplary embodiment of a multitrack, laterally tiltable motor vehicle 1. In accordance with the present teachings, the vehicle 1 has a total of four wheels 2, two wheels 2 which are assigned to a common axle to form a wheel pair 3. As can be seen in FIGS. 1A-1C, the vehicle 1 has a front wheel pair 3, in which the wheels 2 are steerable and a rear, non-steerable wheel pair 3. The vehicle 1 is designed for transporting from one to two persons or occupants 4, the two vehicle occupants 4 sitting one behind the other in the vehicle 1, as shown in FIGS. 1A-1C. As shown in FIGS. 1A-1C, the vehicle 1 has a closed vehicle body 5 which protects the occupants 4, for example, against external weather influences and additionally provides the occupants 4 with improved safety in comparison with an open vehicle body.

As shown in the rear view of FIG. 1C, both the vehicle body 5 and the wheels 2 tilt during the lateral tilting of the vehicle 1. The laterally tilted vehicle 1 is illustrated in the rear view by a dashed line in FIG. 1C.

The drive of the vehicle 1 may be, for example, an electric motor or a combustion engine, or a combination of an electric motor and a combustion engine (a hybrid drive).

Figure 2A:
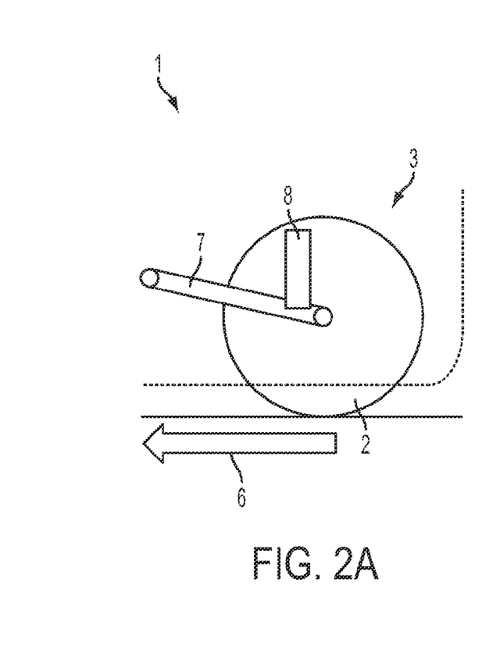
FIG. 2A is a side view of a connection structure used to connect and support a wheel pair of the multitrack, laterally tiltable vehicle of FIGS. 1A-1C.
Figure 2B:
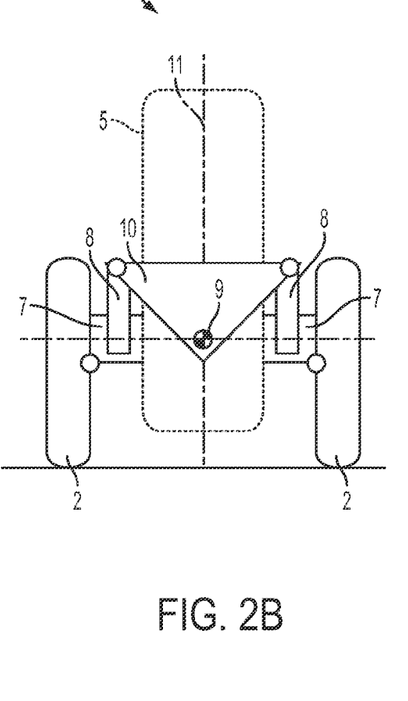
FIG. 2B is a rear view of the multitrack, laterally tiltable vehicle of FIGS. 1A-1C in an upright position.
Figure 2C:
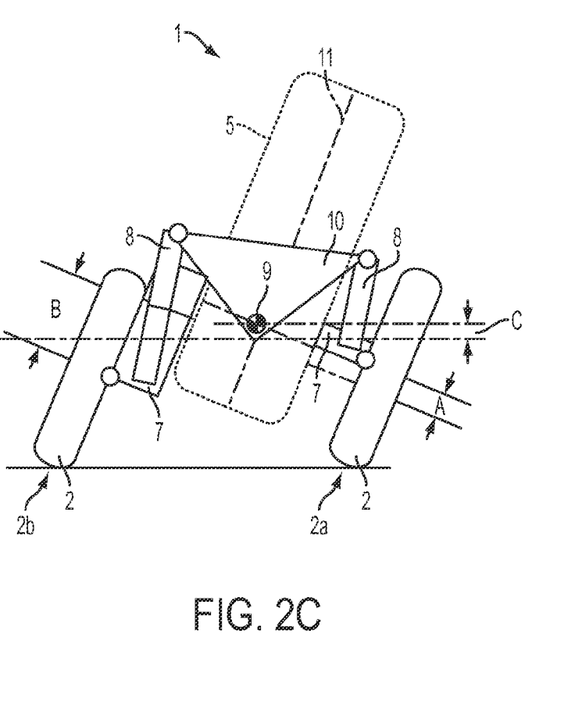
FIG. 2C is a rear view of the multitrack, laterally tiltable vehicle of FIGS. 1A-1C in a tilted position.

FIGS. 2A-2C show a side view, a first rear view and a second rear view of the vehicle 1 which is shown in FIGS. 1A-1C. In FIG. 2A, the forward driving direction of the vehicle 1 is indicated by a corresponding arrow 6. FIG. 2B shows the vehicle 1, as viewed from behind, in a non inclined, upright position. FIG. 2C shows the vehicle 1 in a position which is tilted laterally to the right in the drawing. Each of FIGS. 2A-2C show the wheels 2 of the rear wheel pair 3 of the vehicle 1 which is shown in FIGS. 1A-1C.

As FIGS. 2A-2C show, the wheel 2 is suspended on the vehicle body 5 by means of a wheel control part formed, for example, by a longitudinal link 7. One end of longitudinal link 7 is pivotably mounted on the vehicle body 5 and the other end is rotatably mounted to the wheel 2. Further, FIGS. 2A-2C illustrate that the wheel control parts or longitudinal links 7 of the wheel pair 3 are each supported on the vehicle body 5 via a respective resilient element 8. The resilient element 8, for example a helical spring, has a non-linear spring characteristic with a spring rate which increases with the compression travel A (see FIG. 2C) and decreases with the rebound travel B (see FIG. 2C). During the lateral tilting of the vehicle body 5 and the wheels 2, this leads to the rebound travel B on the tilting outer side being greater than the compression travel A on the tilting inner side. This in turn raises the centroid 9 (see FIGS. 2B and 2C) of the vehicle 1 during lateral tilting of the vehicle 1 in comparison with the position of the centroid 9 when the vehicle is in its upright position, shown in FIGS. 2B and 2C by way of two dash-dotted lines which run horizontally through the centroid 9. The raising of the centroid 9 during the lateral tilting of the vehicle 1 makes automatic self-uprighting of the vehicle body 5 into the upright, neutral position possible, since the centroid 9 of the vehicle 1 has its lowest location in the vehicle body when the vehicle body is in its upright, neutral position.

FIGS. 2A-2C further illustrate that the resilient elements 8, on which the longitudinal links 7 of the wheel pair 3 are supported, are each connected in an articulated manner to a respective limb of a double lever 10 (also called a balancing lever herein). The double lever 10 is mounted in its center, with regard to its longitudinal extent, rotatably on the vehicle body 5. As used herein, the longitudinal extent of the double or balancing lever 10 is understood to be a direction which is transverse with respect to the longitudinal center plane 11 of the vehicle 1.

Figure 3A:
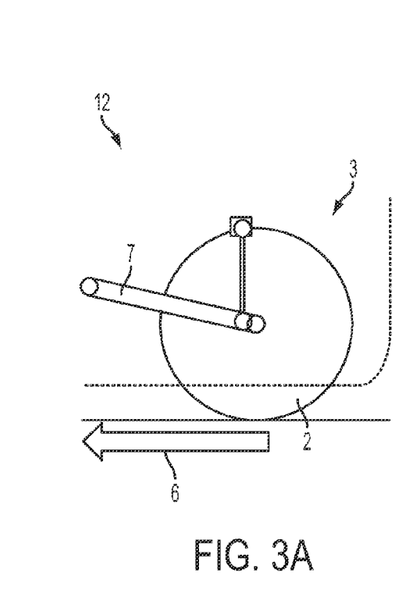
FIG. 3A is a side view of an alternative connection structure used to connect and support a wheel pair of a second embodiment of a multitrack, laterally tiltable vehicle in accordance with the present disclosure.
Figure 3B:
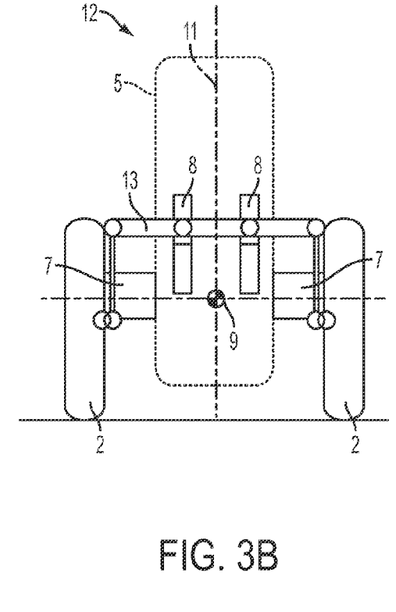
FIG. 3B is a rear view of a second embodiment of a multitrack, laterally tiltable vehicle in an upright position, the multitrack, laterally tiltable vehicle including the wheel connection structure of FIG. 3A in accordance with the present teachings.
Figure 3C:
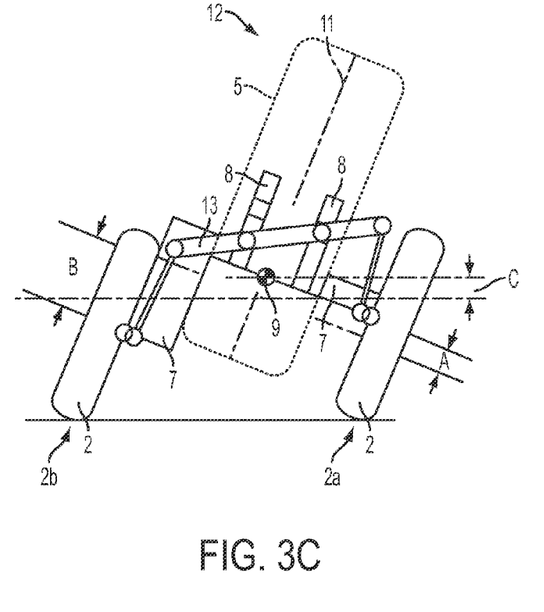
FIG. 3C is a rear view of the second embodiment of a multitrack, laterally tiltable vehicle of FIG. 3B in a tilted position, the multitrack, laterally tiltable vehicle including the wheel connection structure of FIG. 3A in accordance with the present teachings.

In accordance with the present teachings, FIGS. 3A-3C illustrate a rear wheel pair 3 of a second exemplary embodiment of a multitrack, laterally tiltable vehicle 12. In FIG. 3A, the forward driving direction of the vehicle 12 is indicated by a corresponding arrow 6. FIG. 3B shows the vehicle 12, as viewed from behind, in a non-inclined, upright position. FIG. 3C shows the vehicle 12 in a position which is tilted laterally to the right in the drawing, Each of FIGS. 3A-3C show the wheels 2 of the rear wheel pair 3 of the vehicle 12.

The vehicle 12 which is shown in FIGS. 3A-3C differs from the illustration in FIGS. 2A-2C in that the longitudinal links 7 of the rear wheel pair 3 are connected in an articulated manner to a respective limb of a double lever 13. The double lever 13 is mounted rotatably on the vehicle body 5 via the resilient elements 8, which are arranged eccentrically with regard to the longitudinal extent of the double lever 13. As used herein, the longitudinal extent of the double or balancing lever 13 is understood to be a direction which is transverse with respect to the longitudinal center plane 11 of the vehicle 12. As shown in FIGS. 3A-3C, the longitudinal links 7 are connected in an articulated manner to the ends of the balancing lever 13 via connecting struts. The connecting struts are rigid per se, and balancing lever 13 is in turn mounted rotatably on the respective resilient elements 8. On account of the non-linear spring characteristic of the resilient elements 8 during the lateral tilting of the vehicle body 5 and the wheels 2, the compression travel A on the tilting inner side is smaller in this case than the rebound travel B on the tilting outer side of the vehicle 12. As a result, the centroid 9 (shown in FIGS. 3B and 3C) of the vehicle 12 is raised during lateral tilting of the vehicle 12 in comparison with the position of the centroid when the vehicle 12 is in its upright position. This is shown in FIGS. 3B and 3C by way of two dash-dotted lines which run horizontally through the centroid 9. The raising of the centroid 9 during the lateral tilting of the vehicle 12 makes automatic self-uprighting of the vehicle body 5 into the upright, neutral position possible, since the centroid 9 of the vehicle 12 has the lowest location when the vehicle 12 is in the upright, neutral position.

Figure 4A:
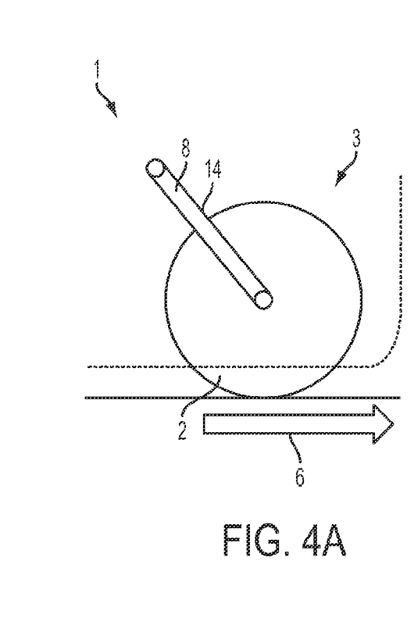
FIG. 4A is a side view of an embodiment of a connection structure used to connect and support a wheel pair of the multitrack, laterally tiltable vehicle of FIGS. 1A-1C.
Figure 4B:
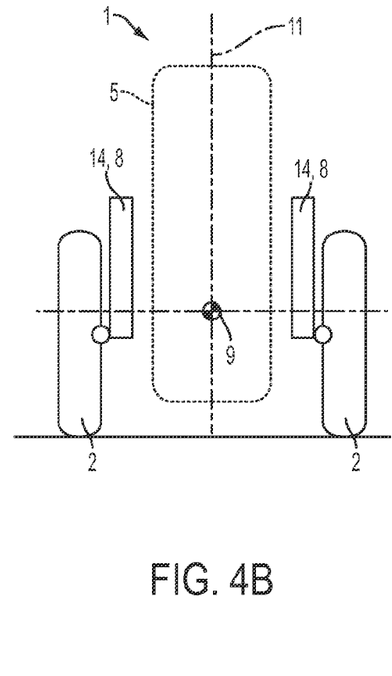
FIG. 4B is a front view of the multitrack, laterally tiltable vehicle of FIGS. 1A-1C in an upright position, the multitrack, laterally tiltable vehicle including the wheel connection structure of FIG. 4A in accordance with the present teachings.
Figure 4C:
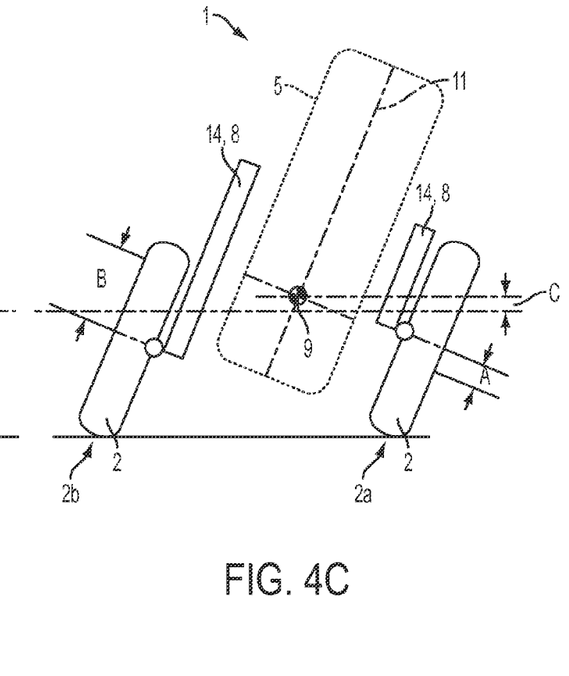
FIG. 4C is a front view of the multitrack, laterally tiltable vehicle of FIG. 4B in a tilted position, the multitrack, laterally tiltable vehicle including the wheel connection structure of FIG. 4A in accordance with the present teachings.

In accordance with another aspect of the present disclosure, FIGS. 4A-4C show side and front views of the vehicle 1 (shown in FIGS. 1A-1C). In FIG. 4A, the forward driving direction of the vehicle 1 is indicated by a corresponding arrow 6. FIG. 4B shows the vehicle 1, as viewed from in front, in a non-inclined, upright position. FIG. 4O shows the vehicle 1 in a position which is tilted laterally to the right in the drawing. Each of FIGS. 4A-4C show the wheels 2 of the front wheel pair 3 of the vehicle 1 which is shown in FIGS. 1A-1C.

FIGS. 4A-4C differ from the previously described illustrations in that the wheel control parts are formed by means of a spring strut 14 instead of a longitudinal link 7. The spring strut 14 is mounted at one end on the vehicle body 5 and is rotatably mounted at the other end on the wheel 2. As is known per se in conventional spring struts, the spring strut 14 also forms one structural unit with the resilient element 8, which has a non-linear spring characteristic as described herein. As a result, during lateral tilting of the vehicle body 5 and the wheels 2, the rebound travel B on the tilting outer side is greater than the compression travel A on the tilting inner side (see FIG. 4C). The centroid 9 is raised during lateral tilting in comparison with the upright position of the vehicle 1, as can also be seen in FIGS. 4B and 4C using the two dash-dotted lines which run horizontally through the centroid 9. The raising of the centroid 9 during the lateral tilting of the vehicle 1 makes automatic self-uprighting of the vehicle body 5 into the upright, neutral position possible, since the centroid 9 of the vehicle 1 has the lowest location when the vehicle is in the upright, neutral position.

Figure 5:
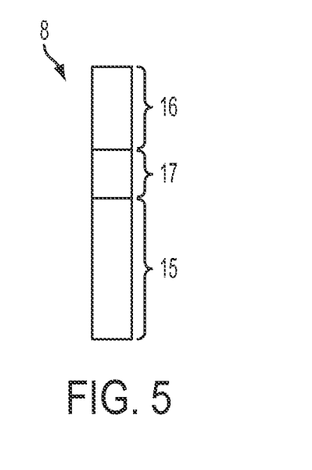
FIG. 5 is a side view of a resilient element with a non-linear spring characteristic in accordance with the present teachings.

FIG. 5 diagrammatically shows a side view of the resilient element 8 with a non-linear spring characteristic. In a first suspension travel range 15, the resilient element 8, for example a helical spring, has a low spring rate in comparison with a second suspension travel range 16. In the suspension travel range 16, the resilient element 8 has a high spring rate in comparison with the first suspension travel range 15. An intermediate range 17 between the first suspension travel range 15 and the second suspension travel range 16 has a medium spring rate which lies between the spring rate of the first suspension travel range 15 and the second suspension travel range 16. As will be understood by those of skill in the art, spring rates are dependent upon the application (e.g., vehicle weight, spring ratio, etc.). In an exemplary embodiment, the high spring rate is two to three times stiffer than the medium spring rate and the low spring rate is two to three tines softer than the medium spring rate. The suspension travel range 17 (intermediate range) is taken up by the resilient element 8 as a result of the weight of the vehicle 1 or 12 including one or two persons and therefore designates the normal suspension travel range, in which the resilient element moves in the case of an upright, normal driving state of the laterally tiltable vehicle 1 or 12. In contrast, the suspension travel range 16 is taken up, for example, during the lateral tilting of the vehicle 1 or 12 as a consequence of the compression on the tilting inner side, and the suspension travel range 15 is taken up as a consequence of the rebound on the tilting outer side.

The above-described, laterally tiltable, multitrack motor vehicle according to the present disclosure is not restricted to the embodiment disclosed herein, but rather also encompasses other embodiments which have an identical effect. For example, a laterally tiltable, multitrack vehicle in accordance with the present teachings need not be a motor vehicle. That is to say, although the present teachings are described with respect to a motor vehicle, other vehicles are encompassed within the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A laterally tiltable, multitrack vehicle, comprising:
   a vehicle body;
   three wheels;
   first and second wheels of the three wheels assigned to a common axle to form a first wheel pair;
   at least one wheel control part suspending each of the first and second wheels of the wheel pair from the vehicle body;
   at least one resilient element supporting each wheel control part on the vehicle body, each of the resilient elements having a non-linear spring characteristic with a spring rate which increases in a compression direction and decreases in a rebound direction.

2. The vehicle as claimed in claim 1, wherein each of the wheel control parts comprises at least one longitudinal link, a first end of the link pivotably mounted on the vehicle body and a second end of the link rotatably mounted to the wheel of the wheel pair.

3. The vehicle as claimed in claim 1, wherein each of the wheel control parts comprises at least one spring strut, a first end of the strut pivotably mounted on the vehicle body and a second end of the strut rotatably mounted to the wheel of the wheel pair.

4. The vehicle as claimed in claim 1, wherein each of the resilient elements are connected in an articulated manner to a respective limb of a double lever, a center of the double lever being rotatably mounted on the vehicle body.

5. The vehicle as claimed in claim 1, wherein each wheel control part is connected in an articulated manner to a respective limb of a double lever, wherein the double lever is rotatably mounted on the vehicle body.

6. The vehicle as claimed in claim 5, wherein each of the resilient elements is arranged eccentrically with regard to a longitudinal extent of the limb.

7. The vehicle as claimed in claim 1, further comprising a fourth wheel, the third and fourth wheels being assigned to a common axle to form a second wheel pair.

8. The vehicle of claim 7, wherein one wheel pair forms steerable front wheels and the second wheel pair forms rear wheels of the vehicle.

9. The vehicle of claim 1, wherein each of the resilient elements is a helical spring with a progressive spring rate.

10. The vehicle of claim 1, wherein the vehicle is a motor vehicle.

11. A laterally tiltable, multitrack vehicle, comprising:
first and second wheels assigned to a common axle;
a third wheel;
first and second wheel control parts suspending, respectively, the first and second wheels from a vehicle body via a resilient element, each resilient element configured to provide one of a first amount of movement and a second amount of movement, different from the first amount, in the respective wheel control part, dependent upon a direction of lateral tilting of the vehicle.

12. The vehicle of claim 11, wherein each resilient element has a non-linear spring characteristic with a spring rate that increases during compression of the resilient element and decreases during extension of the resilient element.

13. The vehicle of claim 11, wherein each of the resilient elements are connected in an articulated manner to a respective limb of a double lever, wherein a center of the double lever is rotatably mounted on the vehicle body.

14. The vehicle of claim 11, wherein each of the resilient elements is a helical spring with a progressive spring rate.

15. The vehicle of claim 11, wherein the resilient element is configured to move the first wheel control part the first amount when located on an inner side of a bend the vehicle is traveling through and wherein the resilient element is configured to move the first wheel control part the second amount when located on an outer side of a bend the vehicle is travel through, wherein the first amount is smaller than the second amount.

16. A laterally tiltable, multitrack vehicle, comprising:
first and second wheels assigned to a common axle;
a third wheel; and
first and second wheel control parts suspending, respectively, the first and second wheels from a vehicle body via a resilient element, each resilient element having a non-linear spring rate, wherein the non-linear spring rate is configured to raise a center of gravity of the vehicle body upon lateral tilting of the vehicle, relative to the center of gravity of the vehicle body when the vehicle is upright.

17. The vehicle of claim 16, wherein each resilient element has a non-linear spring characteristic with a spring rate that increases during compression of the resilient element and decreases during extension of the resilient element.

18. The vehicle of claim 16, wherein each of the resilient elements are connected in an articulated manner to a respective limb of a double lever, wherein a center of the double lever is rotatably mounted on the vehicle body.

19. The vehicle of claim 16, wherein each of the resilient elements is a helical spring with a progressive spring rate.

\* \* \* \* \*